United States Patent
Cok et al.

(10) Patent No.: US 7,228,051 B2
(45) Date of Patent: Jun. 5, 2007

(54) LIGHT PIPE WITH ALIGNMENT STRUCTURES

(75) Inventors: Ronald S. Cok, Rochester, NY (US); John N. Border, Walworth, NY (US); Gary R. Glozer, Spencerport, NY (US)

(73) Assignee: Eastman Kodak Company, Rochester, NY (US)

(*) Notice: Subject to any disclaimer, the term of this patent is extended or adjusted under 35 U.S.C. 154(b) by 525 days.

(21) Appl. No.: 10/815,012

(22) Filed: Mar. 31, 2004

(65) Prior Publication Data

US 2005/0220438 A1 Oct. 6, 2005

(51) Int. Cl.
*G02B 6/00* (2006.01)
*G02B 6/10* (2006.01)

(52) U.S. Cl. ............................ 385/146; 385/147

(58) Field of Classification Search ........... 385/133, 385/146–147, 901, 902; 340/815.42
See application file for complete search history.

(56) References Cited

U.S. PATENT DOCUMENTS

| | | | |
|---|---|---|---|
| 3,033,731 A | 5/1962 | Cole | |
| 3,989,578 A | 11/1976 | Hashimoto | |
| 4,223,979 A * | 9/1980 | Piter et al. | 385/64 |
| 4,392,713 A * | 7/1983 | Piter et al. | 385/64 |
| 5,204,927 A | 4/1993 | Chin et al. | |
| 5,376,201 A | 12/1994 | Kingstone | |
| 5,465,315 A | 11/1995 | Sakai et al. | |
| 5,572,034 A | 11/1996 | Karellas | |
| 5,615,294 A | 3/1997 | Castonguay | |
| 5,784,517 A * | 7/1998 | Johanson | 385/146 |
| 5,938,812 A | 8/1999 | Hilton, Sr. | |
| 5,968,379 A * | 10/1999 | Zhao et al. | 219/121.52 |
| 6,087,194 A * | 7/2000 | Matsukura et al. | 438/25 |
| 6,195,016 B1 | 2/2001 | Shankle et al. | |
| 6,304,703 B1 | 10/2001 | Lowry | |
| 6,418,254 B1 | 7/2002 | Shikata et al. | |
| 2002/0168157 A1 | 11/2002 | Walker et al. | |

FOREIGN PATENT DOCUMENTS

WO 02/39155 5/2002

OTHER PUBLICATIONS

U.S. Appl. No. 10/815,013; filed Mar. 31, 2004; titled "Light Pipe With Molded Optical Surfaces"; of Ronald S. Cok et al.

* cited by examiner

Primary Examiner—Akm Enayet Ullah
(74) Attorney, Agent, or Firm—Andrew J. Anderson

(57) ABSTRACT

A light-conductive pipe is described comprising a body of light-conductive material having an input face having a first cross sectional perimeter at a first end and an output face having a second cross sectional perimeter at a second end, and at least one integral alignment feature projecting from the body providing a third cross-sectional perimeter larger than at least one of the first or second perimeters of the faces, wherein the projecting alignment feature does not have a surface in the same plane as either face. Also described are integral linear arrays of multiple light-conductive pipes, two-dimensional arrays formed from multiple aligned individual light-conductive pipes or stacked integral linear arrays, and expanding optical faceplates formed from such two-dimensional arrays. Tiled flat-panel display systems may be formed from a plurality of modules aligned in an array, each module comprising a flat-panel display having a plurality of pixels and an expanding optical faceplate formed from such two-dimensional arrays.

32 Claims, 11 Drawing Sheets

LIGHT PIPE WITH ALIGNMENT STRUCTURES

FIELD OF THE INVENTION

This invention generally relates to light-conductive pipes and, more particularly, to arrays of such light pipes in a tiled display.

BACKGROUND OF THE INVENTION

One advantage of electronic display systems is the capability to display an image in a variety of formats and sizes. There is particular interest in providing large scale displays, visible to thousands of viewers over considerable distance, such as would be useful for entertainment and advertising. One known method for providing large-scale electronic displays is tiling, in which a matrix of smaller displays are linked together to form a larger display surface.

Image-forming devices such as LCDs, matrixed LEDs, Organic Light Emitting Diodes (OLEDs), and Polymer Light Emitting Diodes (PLEDs) provide a two dimensional image in pixel form, with pixels familiarly arranged in rows and columns. A recognized problem for displays using these components relates to inherent dimensional limitations of the electronic image-forming components themselves. Size and packaging requirements for these devices constrain their use in large-scale display applications, requiring special methods and techniques for image enlargement and tiling.

Optical converters, typically comprising arrays of optical fibers or light pipes, have been recognized as a means for enlarging an electronically generated image in order to display the image in a larger format, such as for tiling applications. As shown in FIG. 2, such light-conductive pipes 10 typically comprising an elongated body 16 of light-conductive material having an input face 12 at a first end and an output face 14 at a second end. For example, U.S. Pat. No. 6,195,016 entitled Fiber Optic Display System with Enhanced Light Efficiency, filed Feb. 27, 2001, by Shankle et al. discloses an enlarged display using images provided from conventional transparencies, visibly enlarged by means of fiber optic light guides, each fiber painstakingly routed from the image forming device to a display panel. Similarly U.S. Pat. No. 6,418,254 entitled Fiber-Optic Display, filed Jul. 9, 2002, by Shikata et al. discloses a fiber optic display coupled with an image projector. U.S. Pat. No. 6,304,703 entitled Tiled Fiber Optic Display Apparatus, filed Oct. 16, 2001, by Lowry discloses a tiling implementation using bundles of optical fibers routed from image-forming components to a display apparatus.

As an alternative to routing individual fibers, symmetrically fixed groupings of optical fibers are preferred. For example, U.S. Pat. No. 5,465,315 entitled Display Apparatus Having A Plurality of Display Devices filed Nov. 7, 1995 by Sakai et al. discloses a tiled display employing LCD devices, with images tiled on a display surface using a fiber optic faceplate. Fiber optic faceplates have also been disclosed for use in a number of other applications, such as U.S. Pat. No. 5,572,034 entitled Fiber Optic Plates For Generating Seamless Images, filed Nov. 5, 1996 by Karellas which discloses tiling using fiber optic faceplates in an X-ray imaging apparatus and U.S. Pat. No. 5,615,294 entitled Apparatus For Collecting Light and It's Method of Manufacture, filed Mar. 25, 1997 by Castonguay which discloses use of a tapered fiber optic faceplate in light-sensing instrumentation.

Fiber optic faceplates that are commercially available are well suited for many types of image-sensing and instrumentation purposes. However, the overall requirements for using fiber optic faceplates for electronic image display are more demanding, particularly when used with LCD, LED, OLED, or PLED devices. In such a case, it is important to have precise positioning of optical fibers at the input and output sides of a fiber optic faceplate. That is, each pixel or group of pixels at the image-forming device has a corresponding fiber light guide within the fiber optic faceplate that directs light from that pixel or pixels to the output display surface. This requirement necessitates custom design of a fiber optic faceplate for the geometry of the image forming device itself (such as for an OLED, for example) and for the geometry of the display surface. It can be appreciated that tiling arrangements introduce even more complexity into the faceplate fabrication problem. As a result, fiber optic faceplates suitable for electronic image display continue to be costly and difficult to fabricate. Solutions for fiber optic faceplate fabrication, such as those disclosed in International Application WO 02/39155 (Cryan et al.) can be highly dependent on accurate dimensions of the optical fiber or of interstitial fillers used to provide a precise spacing between fibers.

One prior art approach for providing accurate positioning of optical fibers in a fiber bundle is disclosed in U.S. Pat. No. 3,989,578 entitled Apparatus For Manufacturing Optical Fiber Bundle, filed Nov. 2, 1976, by Hashimoto, hereinafter termed the '578 patent. In the method of the '578 patent, directed to the manufacture of fiberscope apparatus, optical fiber is wound around a mandrel and aligned in guide frames to obtain precise positioning. In U.S. Pat. No. 5,938,812 entitled Method for Constructing A Coherent Imaging Bundle, filed Aug. 17, 1999 by Hilton, Sr., hereinafter termed the '812 patent, a multilayer fiber optic bundle is fabricated by winding a fiber optic strand around a drum, within a plastic channel. In U.S. Pat. No. 3,033,731 entitled Method For The Manufacture Of Optical Image-Transfer Devices, filed Mar. 6, 1958, by Cole, hereinafter termed the '731 patent, fiber is wound about a mandrel to form rows, which can then be combined to build up a fiber structure. Thus, it can be seen that a drum or mandrel, properly dimensioned, can be a suitable apparatus for positional arrangement of optical fibers in a bundle. However, neither the '578, '812, nor '731 patents provide a suitable solution for optical fiber faceplate fabrication. The methods used in the above-mentioned patents position fibers adjacently, so that the dimensions of the fiber itself determine center-to-center spacing of the fiber bundle. However, such methods are highly dependent on the uniformity of fiber dimensions. In actual practice, however, the actual dimensions of optical fiber can vary widely, even for the same type of fiber. Additional tolerance error is due to winding tension differences as the fiber strands are wound about the drum. More significantly, however, the methods of the '578, '812, and '731 patents do not provide a way to vary the center-to-center distances between fibers, both at input and at output ends of the fiber bundle. As is noted earlier, the capability for varying the center-to-center distance between fibers, lacking with the methods of the '578, 812, and '731 patents, is of paramount importance for display imaging applications.

In an attempt to meet the requirements for variable center-to-center spacing, U.S. Pat. No. 5,204,927 (Chin et al.), hereinafter termed the '927 patent, discloses the use of pairs of axially disposed spacer bars. The use of spacer bars allows a fiber optic bundle to have different fiber spacing at input and output ends. Similarly, U.S. Pat. No. 5,376,201 entitled Method of Manufacturing An Image Magnification Device, filed Dec. 27, 1994, by Kingstone hereinafter termed the '201 patent, discloses the use of spacer guides in a rotating drum application for output fiber spacing, where the output spacer guides, added as each layer of fiber is formed, become part of the completed fiber bundle assembly.

While the '927 and '201 disclosures suggest helpful fabrication techniques for fiber optic couplers, there is felt to be considerable room for improvement. In particular, neither the '927 nor the '201 disclosure are well suited to the requirements for accurate, high-speed, and inexpensive fabrication of fiber optic faceplates as the type of optical converter needed for electronic display imaging. With respect to both '927 and '201 disclosures, curvature effects of the rotating drum constrain the attainable size of a fiber optic faceplate built up in this way. Continuous feeding of optical fiber is necessary, which suggests a substantial amount of waste with the '927 and '201 methods. The method of the '201 disclosure relies heavily on precision manufacture of grooved spacer components, incorporated into the body of the fiber faceplate itself, used to define the spacing of each output row and to set the spacing between rows. Moreover, new spacers are required to be accurately positioned as each row of fibers is wound. This adds cost and complexity to the fabrication process.

U.S. Patent Application Publication 2002/0168157 (Walker et al.) discloses a method for fabrication of a fiber optic faceplate made from stacked sheets of optical fibers, where the sheets are formed using co-extrusion of fiber optic material through a specially designed die. These flat sheet structures can be stacked and bonded together, either using heat or some other means, to form a composite structure, which can be up to a few meters in length, comprising parallel lengths of optical fiber that extend down the length of the composite structure. This composite structure is then cross-sectioned to obtain individual fiber optic faceplates of a selectable thickness. Although this method provides some advantages for mass manufacture of fiber optic faceplates, significant drawbacks remain. For example, the extrusion method of the Publication 2002/0168157 disclosure (the '157 disclosure) maintains a consistent spacing between optical fibers as they are formed; this method is not designed to allow varying the spacing between optical fibers at different points along their lengths. The optical fibers in the faceplate obtained with this method have the same center-to-center spacing throughout the structure. In order to obtain different effective center-to-center spacing for a fiber optic faceplate, input side to output side, the method of the '157 disclosure requires sectioning the composite structure of bonded fibers at an oblique angle. This rigidly constrains the number of possible center-to-center spacing arrangements that can be obtained from any one production run. Using the method of the '157 disclosure has further disadvantages with respect to sizing constraints. The maximum dimensions of a fiber optic faceplate using '157 disclosure techniques is rigidly determined by the width of an extrusion die; obtaining a larger width structure requires building a larger extrusion die and scaling up the supporting mechanical subsystems, at costs which could easily be prohibitive. Spacing between stacked sheets, in a direction orthogonal to the row direction, is not easily varied using the methods of the '157 disclosure, limiting the range of spacing dimensions that can be obtained. Cross-sectional diameters of the component optical fibers cannot be reliably varied from the input side of the fiber optic faceplate to the output side.

As the above examples illustrate, conventional methods for forming optical converters as fiber optic faceplates are based on various techniques such as assembling individual optical fibers into a faceplate structure, characteristically using winding or stitching operations or extruding rows of optical fibers into sheets for stacking, bonding, and cross-sectioning. Given the difficulties, costs and limitations inherent when using optical fibers as light guides, it can be appreciated that alternative methods for providing an optical converter at reduced cost and having added flexibility would be beneficial.

Overall, it can be seen that there is a need for improved methods for fabrication of optical converters, particularly for electronic imaging applications.

SUMMARY OF THE INVENTION

In accordance with a first embodiment of the invention, a light-conductive pipe is provided comprising a body of light-conductive material having an input face having a first cross sectional perimeter at a first end and an output face having a second cross sectional perimeter at a second end, and at least one integral alignment feature projecting from the body providing a third cross-sectional perimeter larger than at least one of the first or second perimeters of the faces, wherein the projecting alignment feature does not have a surface in the same plane as either face.

In accordance with a second embodiment of the invention, an integral linear array of multiple light-conductive pipes is provided, each pipe comprising a body of light-conductive material having an input face having a first cross sectional perimeter at a first end and an output face having a second cross sectional perimeter at a second end, and at least one alignment feature projecting from the bodies of the pipes which spaces and integrally joins the bodies of the multiple pipes in a linear array, wherein the alignment feature does not have a surface in the same plane as either the input or output faces of the pipes and which further provides for complementary two dimensional alignment between the integrally joined light pipes and additional light pipes in a second integral linear array having a complementary cross-sectional configuration.

In accordance with further embodiments of the invention, two-dimensional array may be formed comprising multiple aligned individual light-conductive pipes according to the above first embodiment, or stacked integral linear arrays according to the above second embodiment, wherein the individual pipes or linear arrays are aligned in the two-dimensional array by complementary alignment features projecting from the bodies of the light pipes. Preferred embodiments of the invention include expanding optical faceplates formed from such two-dimensional arrays, and tiled flat-panel display systems comprising a plurality of modules aligned in an array, each module comprising a flat-panel display having a plurality of pixels and an expanding optical faceplate formed from such two-dimensional arrays.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 1b shows a schematic end view of the light pipe of FIG. 1a;

FIG. 1c shows a schematic end view of an alternative face of the light pipe of FIG. 1a;

FIG. 3 shows a schematic end view of an alternative face of the light pipe of FIG. 1a;

FIG. 5b shows a schematic end view of an array of aligned light pipes of FIG. 5a;

FIG. 6b shows a schematic end view of a linear array of aligned light pipes of FIG. 6a;

DETAILED DESCRIPTION OF THE INVENTION

Figure 1A:
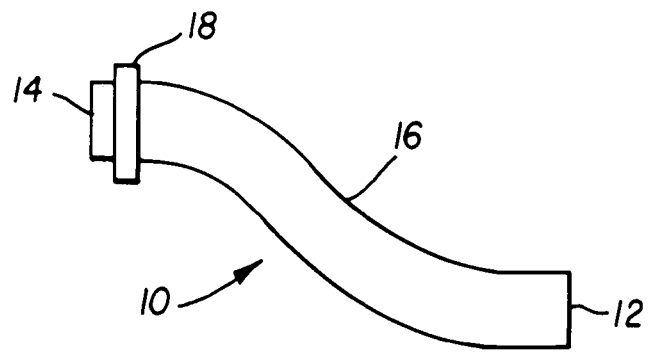
FIG. 1a shows a schematic side view of a light pipe according to one embodiment of the present invention.

Referring to FIG. 1a, the need for improved methods for fabrication of optical converters, particularly for electronic imaging applications, is met according to the present invention with a light-conductive pipe 10 comprising a body 16 of light-conductive material having an input face 12 having a first cross sectional perimeter at a first end and an output face 14 having a second cross sectional perimeter at a second end, and at least one integral alignment feature 18 projecting from the body providing a third cross-sectional perimeter larger than at least one of the first or second perimeters of the faces 12 or 14, wherein the projecting alignment feature 18 does not have a surface in the same plane as either face 12 or 14.

Figure 1B:
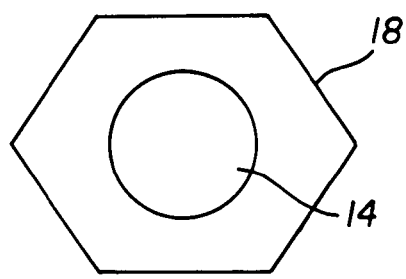

Referring to FIG. 1b, an alternative front view of a face 14 and alignment feature 18 is shown. In this embodiment, the face is circular and the alignment feature is hexagonal. The alignment feature 18 has a cross-sectional perimeter larger than the face 14. The light pipe 10 has a length typically much larger than its diameter. The alignment feature 18 is set back from the face 14 so that the face 14 of the light pipe 10 protrudes from the alignment feature 18. The alignment feature 18 also serves to separate adjacent bodies 16 of light conductive material to prevent transmission between adjacent light conductive pipes 10.

Figure 1C:
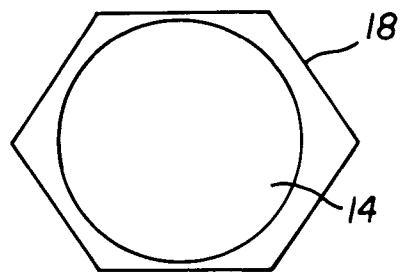
Figure 2:
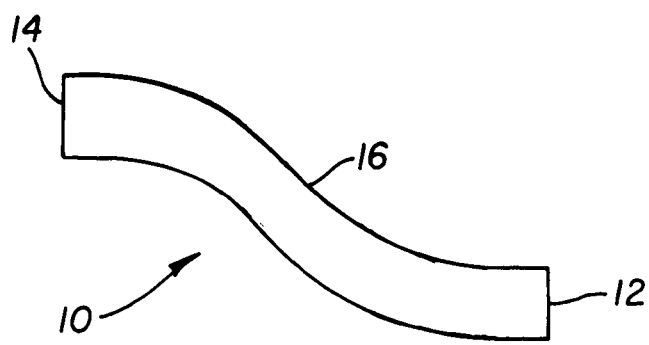
FIG. 2 shows a schematic side view of a prior art light pipe.
Figure 3:
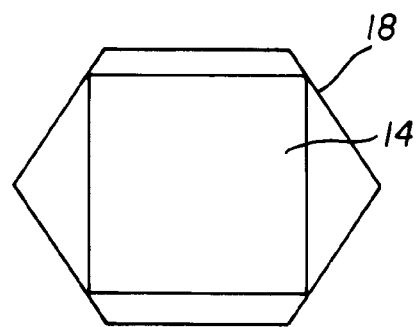

As shown in FIG. 1c in an alternative embodiment, the size of the face can be, and preferably is, as close to the size of the alignment feature as practicable so that the cross-section of the light pipe is as large as possible compared to the cross-section of the alignment feature 18. Referring to FIG. 3, the face of the light pipe need not be circular as shown in FIGS. 1b and 1c. Any shape can be utilized. Other than for FIG. 3, the Figures use circular faces for clarity of illustration.

The alignment feature 18 is used to align a plurality of light pipes 10 in an array. Such alignment features 18 may be applied at a variety of points along the body 16 of the light pipe 10. For example, referring to FIG. 4a, two alignment features 18a and 18b are used, one near each end of the light pipe 10, to provide alignment of the light pipes in an array. The alignment features are preferably located at points along the body 16 of the light pipe 10 where alignment is critical.

Figure 4A:
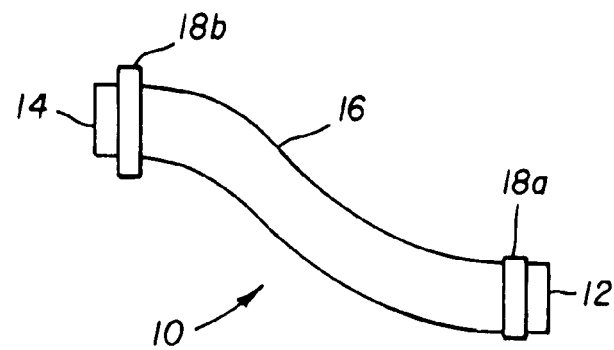
FIG. 4a shows a schematic side view of a light pipe having two alignment features of different sizes according to another embodiment of the present invention.
Figure 4B:
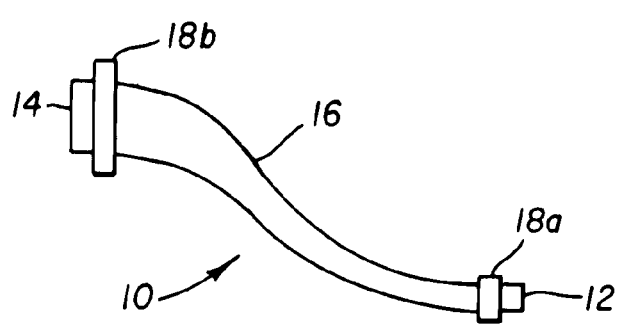
FIG. 4b shows a schematic side view of a variable width light pipe having two alignment features of different sizes according to another embodiment of the present invention.

In FIG. 4a, the size of the alignment feature 18a near the output face 14 is larger than the size of the alignment feature 18b near the input face 12. This enables the input side of a plurality of light pipes to be located closer to each other than the output side, although the actual input and output faces have the same size. It is also possible for the light pipes 10 to have a variable diameter or cross-section, both in size and shape. As shown in FIG. 4b, for example, the output face 14 of the light pipe 10 is larger than the input face 12. The alignment features 18a and 18b are similarly different in size to enable the input faces of a plurality of light pipes to be located closer to each other than the output faces. This is useful for applications requiring a smaller input area than output area. By using two alignment features 18a and 18b, separation between adjacent light pipes 10 is achieved and cross-talk between light pipes 10 is avoided.

Figure 5A:
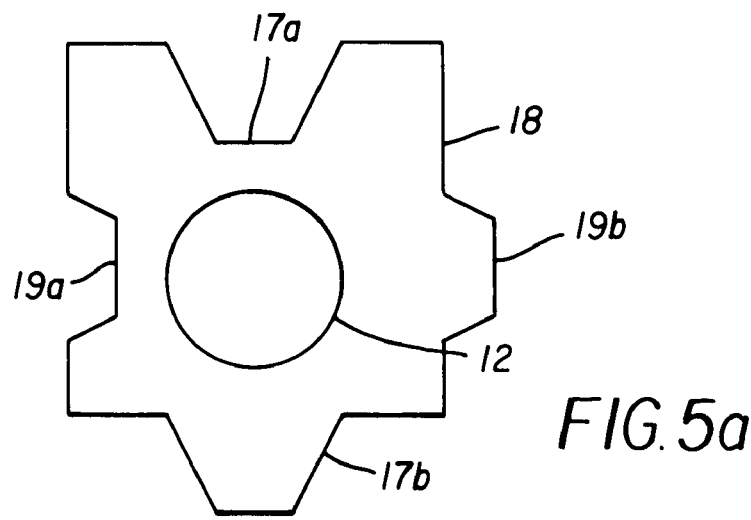
FIG. 5a shows a schematic end view of a light pipe having alignment features with protrusions and matching indentations according to an alternative embodiment of the present invention.
Figure 5B:
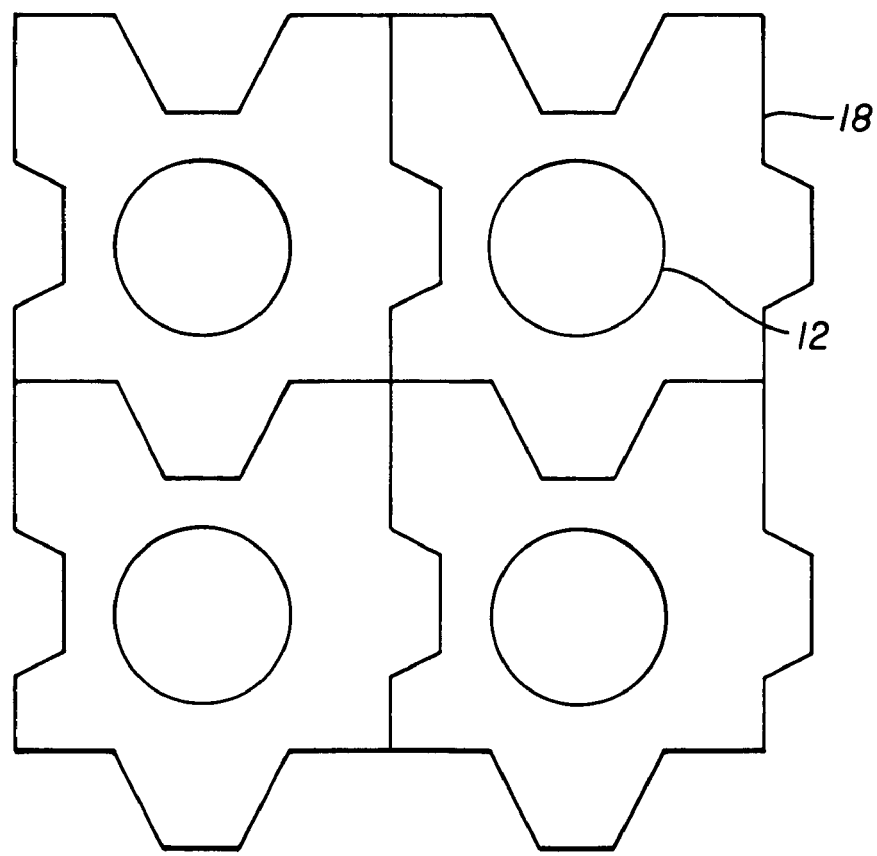

The shapes of the alignment features 18 are carefully chosen to enable alignment of groups of light pipes 10 in an array. Referring to FIG. 5*a*, the alignment feature 18 surrounds the body of the light pipe so that the perimeter of the alignment feature 18 is larger than the perimeter of the face 12 and includes indentations 17*a* and 19*a* and corresponding protrusions 17*b* and 19*b*. These matching features provide alignment between adjacent light pipes both within a row and between rows, as shown in FIG. 5*b*. If a linear array of light pipes are made in a single step, the individual light pipe are molded in alignment with their neighbors and the protrusions and indentations 19*b* and 19*a* are unnecessary. However, they may be employed on the ends of the row of light pipes to provide alignment with any neighboring light pipe array, as described below. The alignment features 18 may be molded from the same material as the light pipe bodies 16 or from a different material to further reduce cross talk between adjacent light pipes 10.

Figure 6A:
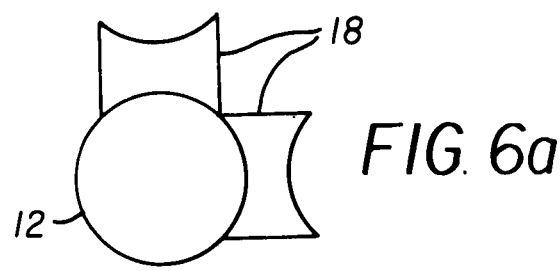
FIG. 6a shows a schematic end view of a light pipe having alignment features with protrusions and matching indentations according to an alternative embodiment of the present invention.
Figure 6B:
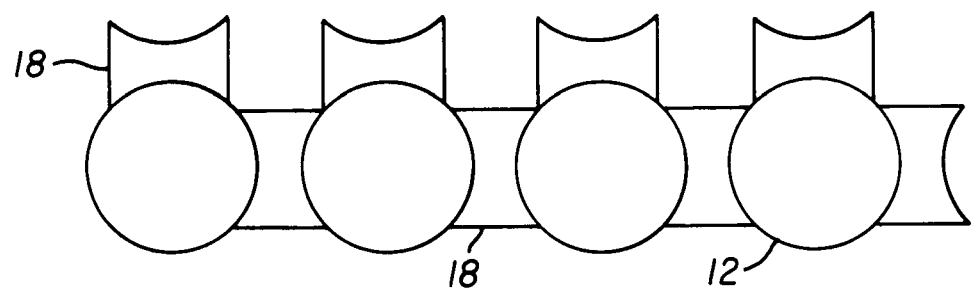

As shown in FIGS. 5*a* and 5*b*, the alignment feature surrounds the body of the light pipe and provides a cross-sectional perimeter (including the cross section of the body portion that the alignment feature surrounds) greater than the cross-sectional perimeter of a face. In an alternative embodiment, the alignment feature 18 providing a cross-sectional perimeter in combination with the cross section of the body portion may protrude from only a portion of the light pipe as shown in FIG. 6*a*, and still provide alignment in a linear array (FIG. 6*b*) and two-dimensional array (FIG. 6*c*).

Figure 6C:
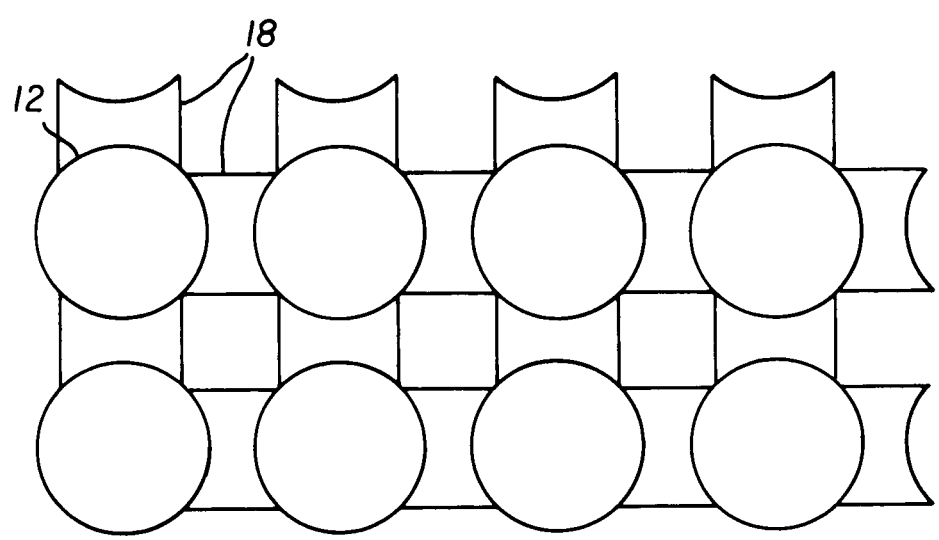
FIG. 6c shows a schematic end view of a two-dimensional array of stacked linear light pipes of FIG. 6b.
Figure 7A:
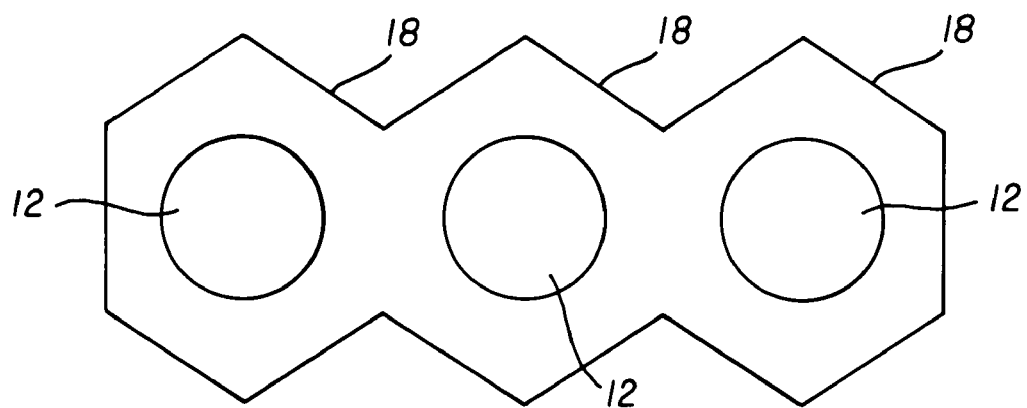
FIG. 7a shows a schematic end view of a linear array of aligned light pipes having hexagonal alignment features.
Figure 7B:
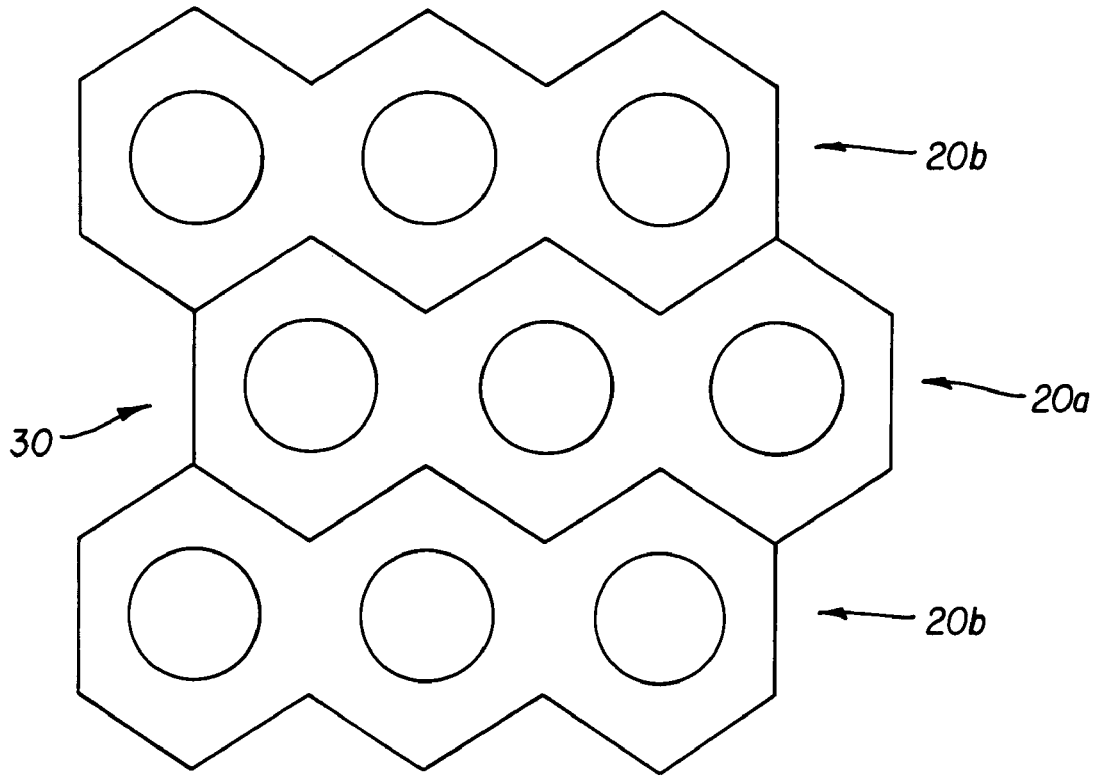
FIG. 7b shows a schematic end view of a two-dimensional array of linear light pipes of FIG. 7a stacked in offset rows according to an alternative embodiment of the present invention.
Figure 8A:
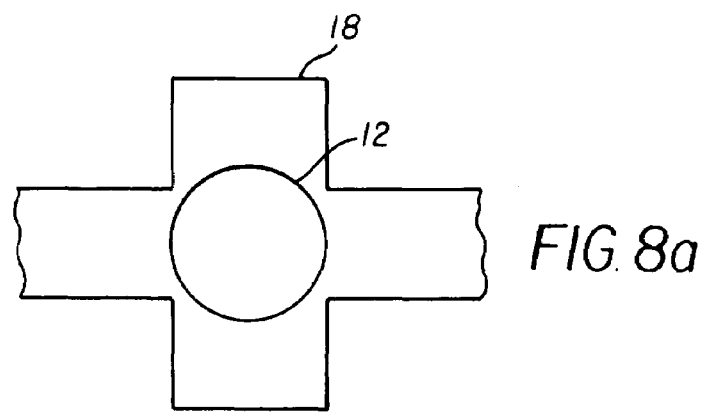
FIG. 8a shows a schematic end view of a light pipe having cross-shaped alignment features according to an alternative embodiment of the present invention.
Figure 8B:
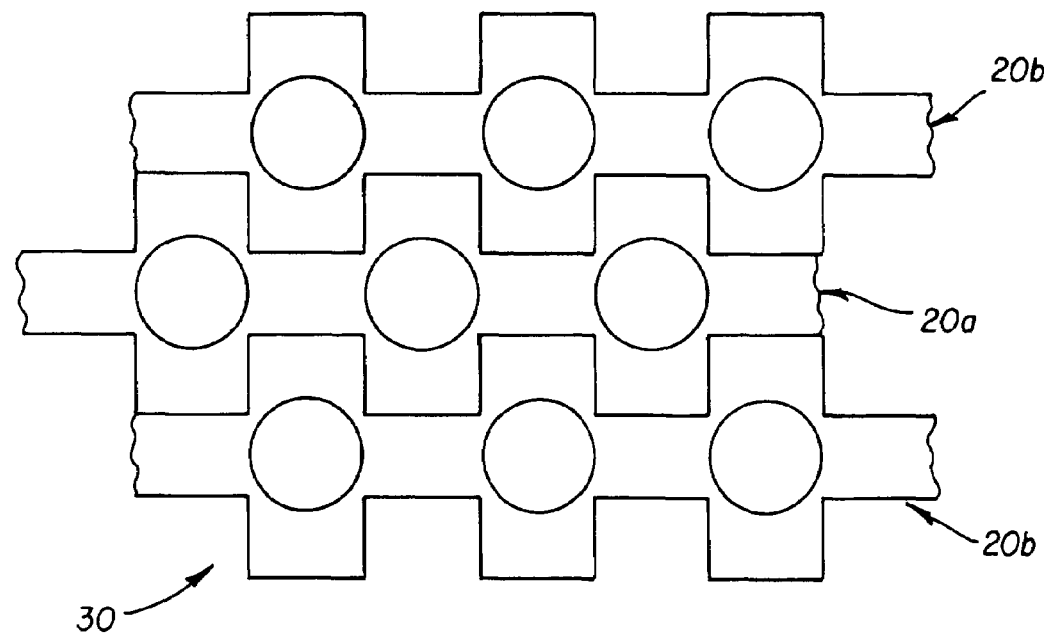
FIG. 8b shows a schematic end view of a two-dimensional array of light pipes of FIG. 8a stacked in offset rows according to an alternative embodiment of the present invention.
Figure 9A:
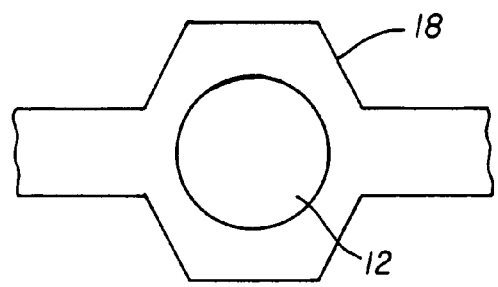
FIG. 9a shows a schematic end view of a light pipe having hexagonal alignment features according to an alternative embodiment of the present invention.
Figure 9B:
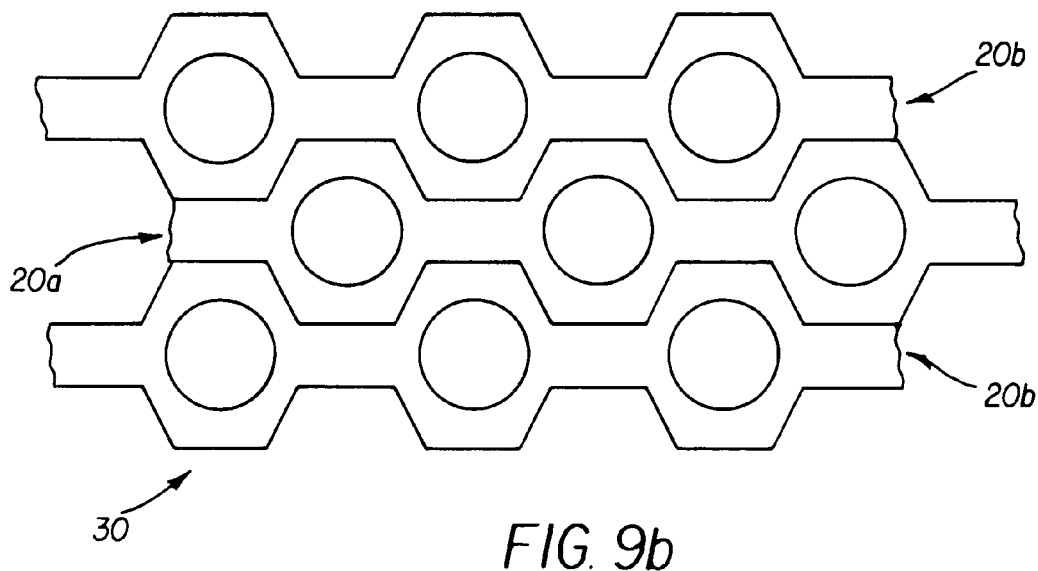
FIG. 9b shows a schematic end view of a two-dimensional array of light pipes of FIG. 9a stacked in offset rows according to an alternative embodiment of the present invention.

As shown in FIGS. 5*b* and 6*c*, the center points of the faces of the light pipes form a regular rectangular grid. However, other arrangements are possible. Referring to FIG. 7*a*, a hexagonal arrangement of alignment features 18 is provided for faces 12 and formed into a row 20. In this arrangement, the center points of the faces 12 within a row (e.g. 20*a*) are in a line, as in FIG. 5*b*. However, as shown in FIG. 7*b*, the rows 20*b* above and below are in a line but are offset to form alternating structures whose center face points are triangles and form a faceplate 30. FIGS. 8*a* and 8*b* illustrate an alternative alignment feature shape that produces a similar, offset effect between the rows. Likewise, FIGS. 9*a* and 9*b* show yet another embodiment having offset rows. One advantage of using offset rows such as are shown in FIGS. 7*b*, 8*b*, and 9*b* is that the faces 12 are located closer together than in the straight rows illustrated in FIGS. 5*b* and 6*c*.

Figure 10:
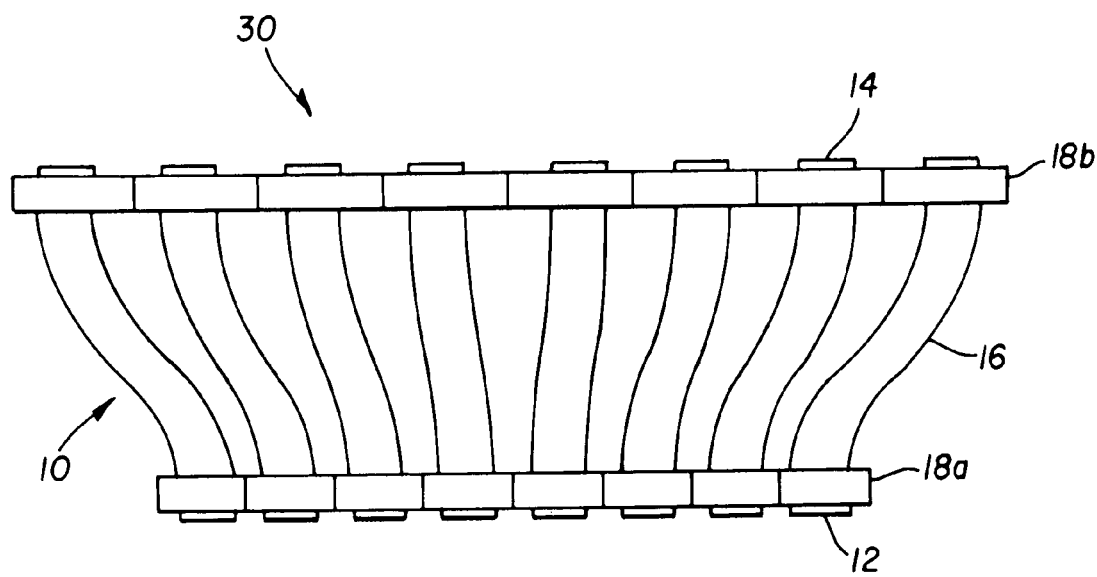
FIG. 10 shows a schematic side view of a row of light pipes having a smaller input face and a larger output face according to an embodiment of the present invention.

A side view illustrating the location of a row of light pipes 10 is shown in FIG. 10. A row of light pipes 10 as shown in FIG. 10 can be preferably molded as a single unit in a linear array in which the light pipes 10 are connected together at the alignment features 18*a* and 18*b*. In this Figure, the output faces 14 are aligned in a plane as are the input faces 12. The alignment features 18*a* separate the input faces while the alignment features 18*b* separate the output faces. However, the output faces are separated from each other by a wider distance than the input faces 12 because the alignment features 18*a* are smaller than the alignment features 18*b*. Hence, the output side of the light pipe array is larger than the input side, as illustrated in FIG. 4*a*. It is also possible, as shown in FIG. 4*b*, for the input end of the light pipes 10 to be smaller than the output end. Multiple rows of light pipes are aligned in a two-dimensional array of light pipes to form a faceplate 30.

Figure 11:
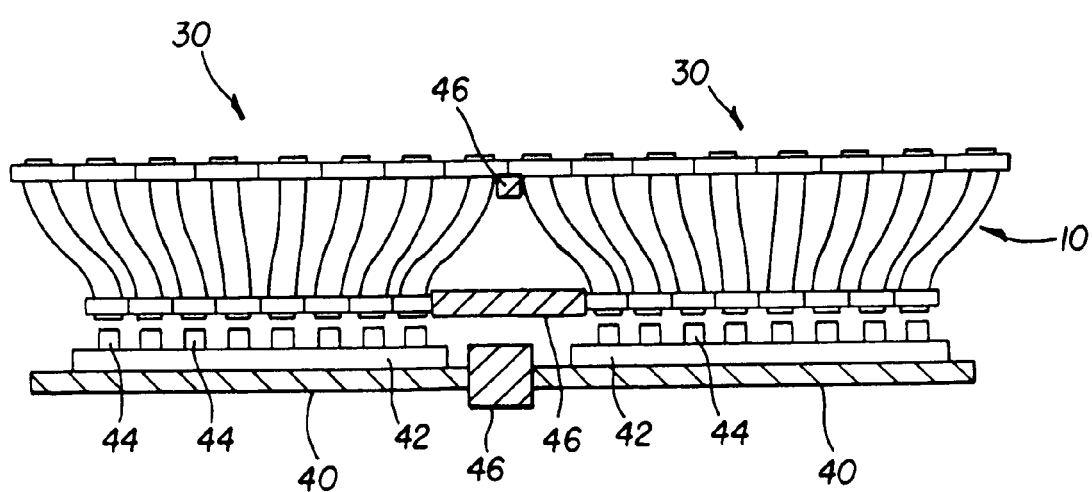
FIG. 11 shows a schematic side view of a row of light pipes with a flat-panel display according to an embodiment of the present invention.

Referring to FIG. 11, the faceplates 30 are aligned together to form tiled faceplate arrays. Each tile is aligned along an edge to form a two-dimensional structure. Because the output side of the faceplate is larger than the input side, additional structures may be supplied on the input side to mechanically support the tiled array, for example supports 46. Each tile includes a faceplate 30 and a flat-panel display 42, each flat-panel display 42 having an array of pixels 44. The pixels are aligned with the input faces of the light pipes 10 in each faceplate 30. The flat-panel displays 42 are located in a plane but, because the input side of the faceplate 30 is smaller than the output side, sufficient space is provided for the flat-panel displays 42, including any supporting flat-panel display needs such as framing, electronics, and connectors (not shown). A printed circuit board 40 can be included to provide support and additional electronics, connectors, etc, as desired by the designer.

The choice of face shape, face location, and alignment feature arrangement for the light pipes are determined by the location and shape of the pixels 44 on the flat-panel displays 42. Preferably, as much light as possible from the pixels 44 will enter the input faces 12 of the light pipes 10 and be conducted through the light pipes to the output face 14 where the light escapes. The input face should be shaped to match the shape of the pixels 44 (typically a roughly rectangular shape). The light pipes 10 may be employed to capture the light from more than one pixel 44. In a preferred embodiment, the alignment features 18 of the light pipes 10 are as small as possible so that as much of the flat-panel display area as possible is aligned with an input face. If the flat-panel display 42 is matched to the faceplate 30, no pixels may be wasted. However, in some embodiments, some pixels 44 may not be aligned with an input face, and the light output from those pixels may be wasted (e.g., if an existing flat-panel display is used that is not matched to the faceplate 30). In such instances, the flat-panel displays 42 may be programmed not to output light at those pixels. Wasted pixels may not be critical, however, since in a tiled display using existing flat-panel displays, each flat-panel display is likely to be used at a much lower resolution than it is capable of supporting.

Figure 12:
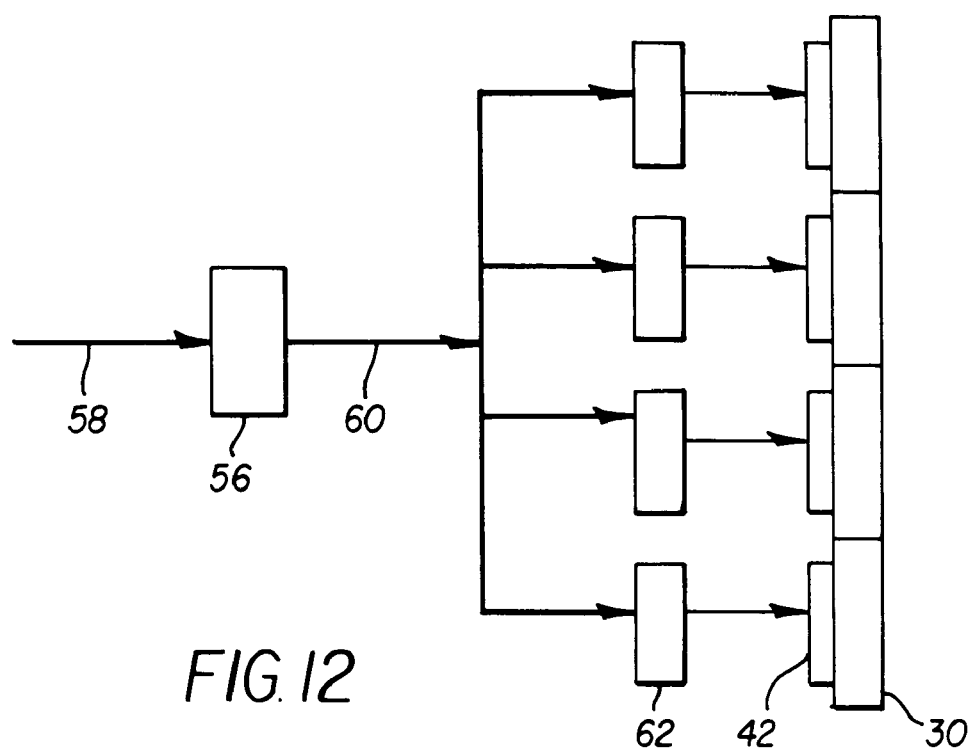
FIG. 12 shows a schematic diagram of an embodiment of the present invention.

Referring to FIG. 12, in operation, a system display controller 56 divides an input signal 58 into signals 60 that can be communicated to a plurality of display controllers 62. The signals 60 may be organized into a bus structure (as shown) or with point-to-point connections, serial connections, or other means well known in the art. The display controllers 62 communicate a specific portion of the original input signal 58 to their associated flat-panel displays 42. The flat-panel displays 42 output light that is emitted from pixels (not shown in FIG. 11), enters the faceplate 30 and is emitted to a viewer or viewers.

Figure 13:
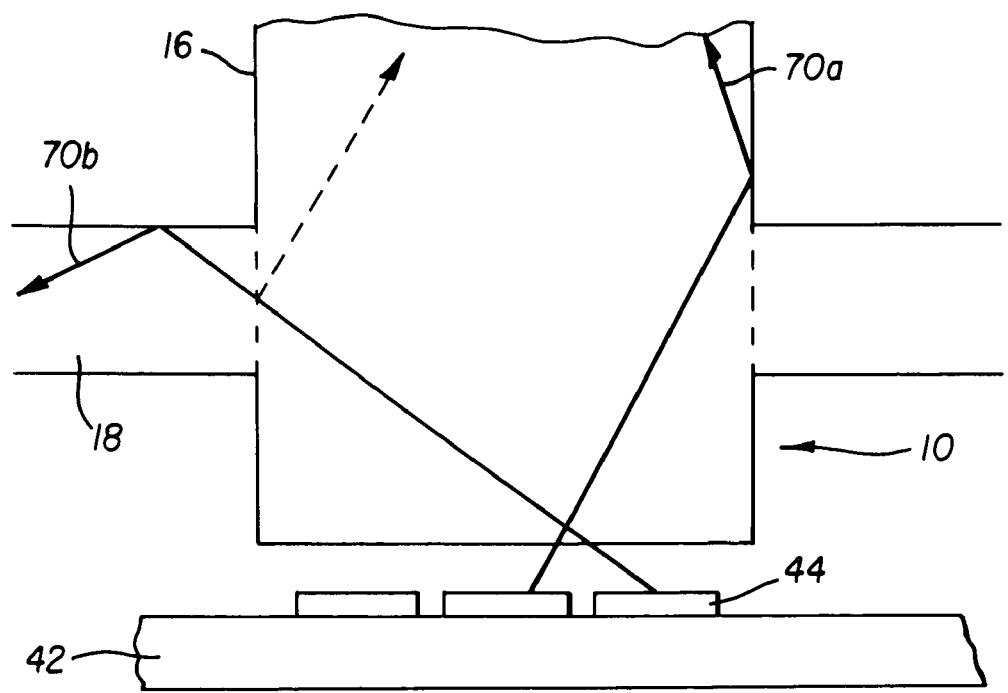
FIG. 13 shows a schematic side view of a light pipe and pixels according to one embodiment of the present invention.

Referring to FIG. 13, not all of the light emitted by a pixel or pixels 44 will necessarily pass through the associated light pipe 10. Most of the light that enters the pipe, as shown with light ray 70*a*, will travel through the light pipe 10. However, because the alignment features 18 may be composed of the same material as the light pipe itself and may be part of the body of the light pipe, light that enters the alignment features, as illustrated with light ray 70*b*, will be lost. Some of the light may travel through the alignment feature 18, enter a neighboring light pipe, and be emitted by the neighboring light pipe, thus reducing the resolution of the display. However, the fraction of light that does so is relatively small, particularly if the alignment feature 18 is kept small and thin. The alignment feature can be made of a different material with a higher refractive index or an opaque material to prevent this loss of light. Absorptive coatings or materials (not shown) may be provided on the alignment feature portion to inhibit this effect.

The light pipes of the present invention may be manufactured by injection molding. Such molding machines are known and capable of providing the necessary precision. Specific molding processes which may be employed include those described in concurrently filed, commonly assigned, copending U.S. Ser. No. 10/815,013, the disclosure of which is incorporated by reference herein. Suitable materials for the light pipes include plastics such as polycarbonates, acrylics including polymethylmethacrylates, fluoropolymers, cyclic olefins, polysulfones, polyethersulfones, polyetherimides, and optical nanocomposite type derivatives of the afore mentioned transparent plastics that have been modified with inorganic materials to improve the optical properties of the plastics such as higher refractive index or lower chromatic dispersion. Flat-panel displays, such as liquid crystal displays are commercially available. System and display controllers may be made using conventional integrated circuit technology. Conventional mounting and interconnection means may be used to provide signal, power, and control capabilities.

The present invention provides an advantage in that it provides self-alignment features. In addition to providing for the alignment between individual light pipes and rows of light pipes, these features may also provide for alignment between tiled face plates. Light pipe configurations such as those shown in FIG. 5a, e.g., provide alignment features for adjacent elements or between rows of elements. The alignment features on the top and bottom rows and on the edge elements of each faceplate 30 formed with such light pipe configuration are also available to align neighboring faceplates 30.

Figure 14A:
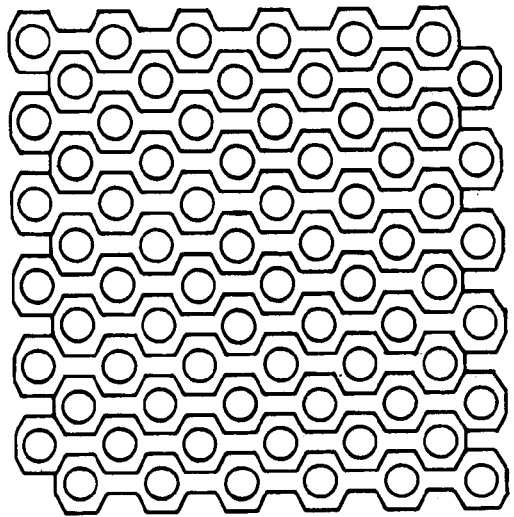
FIG. 14a shows a schematic diagram of an array of light pipes of FIG. 9a having offset rows according to one embodiment of the present invention.
Figure 14B:
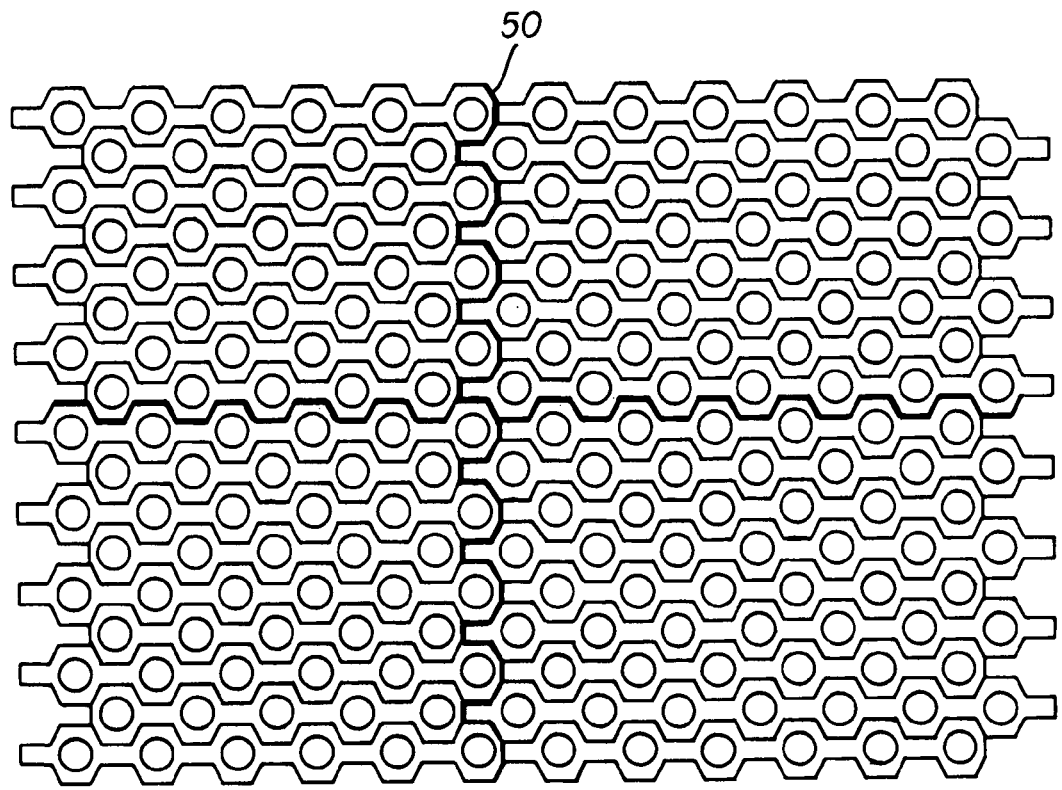
FIG. 14b shows a schematic diagram of four aligned arrays of light pipes of FIG. 9a having offset rows according to one embodiment of the present invention.
Figure 15A:
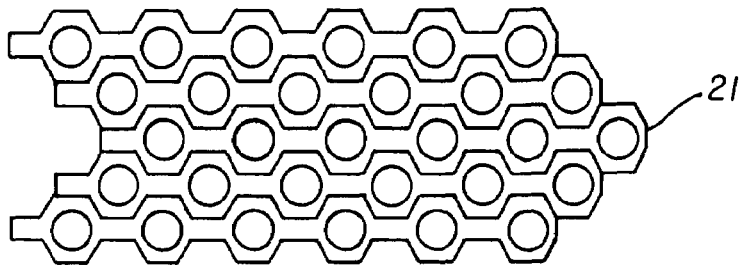
FIG. 15a shows a schematic diagram of a portion of an array of light pipes of FIG. 9a having offset rows according to another embodiment of the present invention.
Figure 15B:
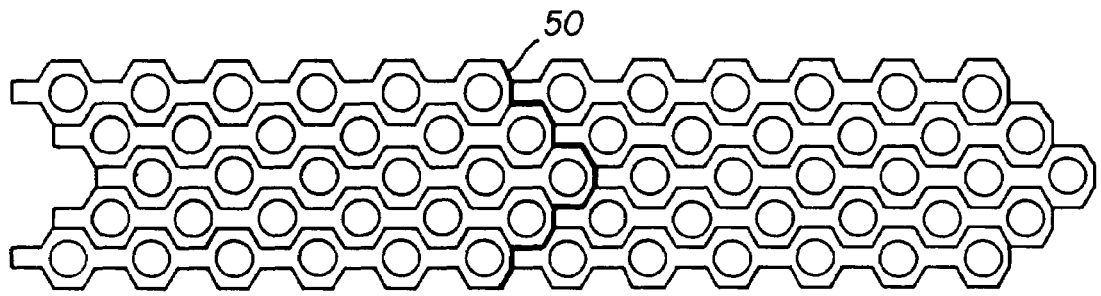
FIG. 15b shows a schematic diagram of portions of two aligned arrays of light pipes of FIG. 9a having offset rows according to another embodiment of the present invention.
Figure 15C:
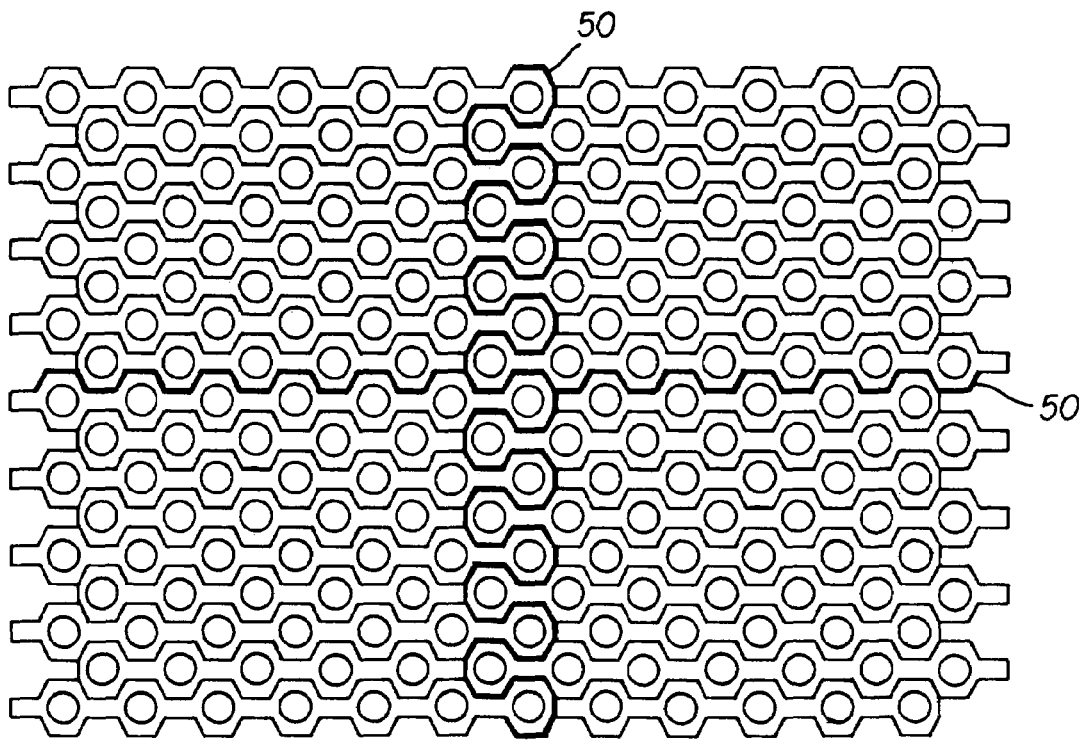
FIG. 15c shows a schematic diagram of portions of four aligned arrays of light pipes of FIG. 9a having offset rows extending at least one light pipe beyond another row according to another embodiment of the present invention.

Referring to FIG. 14a, an array of elements similar to those of FIG. 9a is shown. The rows are aligned as described above using the protrusions provided to form offset rows. FIG. 14b illustrates the juncture of tiled faceplates in a two-by-two array and indicates the alignment between the tiles with the alignment line 50. Alignment features can be made even larger by offsetting rows by more than one light pipe, as shown in FIGS. 15a, 15b and 15c. In FIG. 15a, the center row 21 is indented further than the rows above or below to form a larger opening for alignment. FIG. 15b illustrates a portion of two of the faceplates and indicates their alignment with an alignment line 50. FIG. 15c illustrates an indentation on alternate rows. Even larger openings can be formed in this way using either the offset or in-line arrangements of, for example, FIG. 9b and FIG. 5b. These arrangements also enable interdigitation of pixels along the edges of adjacent flat panel displays, which can improve perceived uniformity of tiled arrays. In such embodiments, the controllers 62 and 56 of FIG. 12 must also be programmed to send the suitable display information to the appropriate pixel to accommodate the pixels that are not used and the location in the output side of the faceplate to which the associated pixel light must go.

The invention has been described in detail with particular reference to certain preferred embodiments thereof, but it will be understood that variations and modifications can be effected within the spirit and scope of the invention.

PARTS LIST 10 light pipe
12 input face
14 output face
16 body
17a indentation
17b protrusion
19a indentation
19b protrusion
18 alignment feature
18a alignment feature
18b alignment feature
20 row
20a row
20b row
21 row
30 faceplate
40 printed circuit board
42 flat-panel display
44 pixel(s)
46 support
50 alignment line
56 controller
58 input signal
60 signal
62 controller
70a light ray
70b light ray

What is claimed is:

1. A light-conductive pipe comprising a body of light-conductive solid material having an input face having a first cross sectional perimeter at a first end and an output face having a second cross sectional perimeter at a second end, and at least one integral alignment feature projecting from the body providing a third cross-sectional perimeter larger than at least one of the first or second perimeters of the faces, wherein the projecting alignment feature does not have a surface in the same plane as either face.

2. The light-conductive pipe of claim 1, comprising first and second integral alignment features for providing alignment of the first and second ends.

3. The light-conductive pipe of claim 1, wherein the body and integral alignment feature are made of plastic.

4. The light-conductive pipe of claim 3 wherein the plastic is one or more of the group including polycarbonates, acrylics, fluoropolymers, cyclic olefins, polysulfones, polyethersulfones, and polyetherimides.

5. The light-conductive pipe of claim 1, wherein the alignment feature is formed at the same time as the body.

6. The light-conductive pipe of claim 1, wherein the cross sectional perimeter of the alignment feature is in the shape of a quadrilateral.

7. The light-conductive pipe of claim 1, wherein the cross sectional perimeter of the alignment feature is in the shape of a six-sided polygon.

8. The light-conductive pipe of claim 1, wherein the body of the light-conductive pipe is bent and the input and output faces are in parallel planes.

9. The light-conductive pipe of claim 1, wherein the alignment feature comprises the same light-conductive material as the body.

10. The light-conductive pipe of claim 1, wherein the alignment feature has a different refractive index than the body.

11. The light-conductive pipe of claim 1, wherein the alignment feature is opaque.

12. A two-dimensional array comprising multiple aligned light-conductive pipes according to claim 1, wherein the pipes are aligned in the two-dimensional array by complementary alignment features projecting from the bodies of the light pipes.

13. An expanding optical faceplate formed from an array of aligned light-conductive pipes according to claim 12.

14. A tiled flat-panel display system comprising a plurality of modules aligned in an array, each module comprising a flat-panel display having a plurality of pixels and an expanding optical faceplate according to claim 13.

15. An integral linear array of multiple light-conductive pipes, each pipe comprising a body of light-conductive material having an input face having a first cross sectional perimeter at a first end and an output face having a second cross sectional perimeter at a second end, and at least one alignment feature projecting from the bodies of the pipes which spaces and integrally joins the bodies of the multiple pipes in a linear array, wherein the alignment feature does not have a surface in the same plane as either the input or output faces of the pipes and which further provides for complementary two dimensional alignment between the integrally joined light pipes and additional light pipes in a second integral linear array having a complementary cross-sectional configuration.

16. The array of light-conductive pipes of claim 15, comprising first and second integral alignment features for providing alignment of the first and second ends.

17. The array of light-conductive pipes of claim 15, wherein the bodies and integral alignment feature are made of plastic.

18. The light-conductive pipe of claim 17 wherein the plastic is one or more of the group including polycarbonate, acrylics, fluoropolymers, cyclic olefin, polysulfone, polyethersulfones, and polyetherimide.

19. The array of light-conductive pipes of claim 15, wherein the bodies of the light-conductive pipe are bent and the input and output faces are in parallel planes.

20. The array of light-conductive pipes of claim 15, wherein the alignment feature comprises the same light-conductive material as the bodies.

21. The array of light-conductive pipes of claim 15, wherein the alignment feature has a different refractive index than the bodies.

22. The array of light-conductive pipes of claim 15, wherein the alignment feature is opaque.

23. The array of light-conductive pipes of claim 15, wherein the alignment feature is formed at the same time as the bodies.

24. A two-dimensional array of light-conductive pipes comprising a stack of multiple integral linear arrays of light-conductive pipes according to claim 16, wherein the integral linear arrays are aligned in the two-dimensional array by complementary alignment features projecting from the bodies of the integrally joined light pipes in the integral linear arrays.

25. The stack of arrays of light-conductive pipes of claim 24, wherein the faces of the pipes form a regular square grid.

26. The stack of arrays of light-conductive pipes of claim 24, wherein the faces of the pipes form a regular hexagonal grid.

27. An expanding optical faceplate formed from a stacked array of light-conductive pipes according to claim 24.

28. A tiled flat-panel display system comprising a plurality of modules aligned in an array, each module comprising a flat-panel display having a plurality of pixels and an expanding optical faceplate according to claim 27.

29. The tiled flat-panel display system claimed in claim 28, wherein the flat-panel display is a liquid crystal display.

30. The tiled flat-panel display system claimed in claim 28, wherein the flat-panel display is an organic light emitting diode display.

31. The tiled flat-panel display system claimed in claim 28, wherein the faceplates of adjacent aligned modules have complementary protrusions and indentations to provide alignment features for the faceplates.

32. The tiled flat-panel display system claimed in claim 31, wherein each faceplate comprises rows of light pipes, at least one row extending at least one light pipe beyond another row.

* * * * *